United States Patent
Bodenheimer et al.

[15] 3,651,397
[45] Mar. 21, 1972

[54] METHOD AND DEVICE FOR TESTING APPARATUS FOR SUSCEPTIBILITY TO MAGNETIC FIELD

[72] Inventors: David W. Bodenheimer, Carrollton; Elbert W. Paschetag, Jr., Garland, both of Tenn.

[73] Assignee: LTV Electrosystems, Inc., Dallas, Tex.

[22] Filed: Mar. 9, 1970

[21] Appl. No.: 17,650

[52] U.S. Cl. ..........................324/34 R, 324/158 R, 325/67, 325/133, 325/363
[51] Int. Cl. ..........................................................G01r 33/00
[58] Field of Search ...............324/34 R, 158 R; 325/67, 133, 325/363

[56] References Cited

UNITED STATES PATENTS 2,820,193  1/1958  Clawson ..............................324/158

OTHER PUBLICATIONS

Peterson, A. E., Performance of Portable Electrical Instruments In Magnetic Fields; AIEE Technical Paper, 48– 219; Aug. 1948, pp. 1– 8.
Curran, J., Radio Frequency Interference Test Equipment; I.B.M. Tech. Discl. Bulletin; Vol. 7, No. 9; Feb. 1965; p. 758.

*Primary Examiner*—Rudolph V. Rolinec
*Assistant Examiner*—R. J. Corcoran
*Attorney*—James D. Willborn

[57] ABSTRACT

Disclosed is improved apparatus and an improved method for use in testing the susceptibility of electrical apparatus to magnetic fields, wherein current is provided to an antenna for producing a directional magnetic field within each of a plurality of known ranges of intensity and is further varied within each of the respective ranges, as required, to obtain readings corresponding to a voltage falling within a range of voltages which are capable of being sensed and therefore measured by other than a narrow-band voltmeter.

8 Claims, 4 Drawing Figures

PATENTED MAR 21 1972 3,651,397

INVENTORS
DAVID W. BODENHEIMER
ELBERT W. PASCHETAG, JR.

*James D. Wilbur*

ATTORNEY

METHOD AND DEVICE FOR TESTING APPARATUS FOR SUSCEPTIBILITY TO MAGNETIC FIELD

The increased use of electrical and electronic apparatus increases the requirement to determine the susceptibility of a particular piece of apparatus to interference caused by magnetic fields. Magnetic effects, once considered negligible, have become a major source of concern. Electronic equipment often operates in the presence of a magnetic field, cables coupling the equipment are subject to magnetic effects, and often in a single piece of equipment a portion thereof produces a magnetic field and another portion, sensitive to magnetic fields, is often positioned close to the producing portion. Therefore, it has become common practice to test electrical apparatus, and particularly electronic apparatus, to determine whether or not a magnetic field will affect the performance of the equipment. Where the unit is susceptible to magnetic effects, it is usually necessary to determine the strength of the field so that corrective measures can be made.

MIL-STD-B461 and MIL-STD-462 set forth the military requirements for magnetic susceptibility testing, and the tests and standards set forth there are applied almost universally within industry. In order to facilitate the disclosure of the present invention, the requirements of MIL-STD-461/462 are discussed with respect to the present invention; however, it should be recognized that other testing requirements exist, and this invention is equally useful for testing to these other requirements. The test apparatus and method of testing set forth in MIL-STD-461/462 is illustrated in FIG. 1. An oscillator 11 is coupled through appropriate conductors and a resistor 12 to loop antenna 13. A narrowband voltmeter 14 is used to measure the voltage drop across resistor 12. Resistor 12 is specifically chosen as a 1 ohm resistor, thus the voltage reading is directly readable, in amperes, through the application of Ohm's Law. Since the current in the resistor is the same as that in the loop antenna, the magnetic flux density at a given distance from the antenna can be determined when the physical and electrical characteristics of the antenna are known.

For susceptibility testing, MIL-STD-461/462 provides that the antenna shall be wound on a non-conductive, circular core or coil form, and consists of 10 turns of number 16 AWG wire. The antenna is 12 cm. in diameter, and the respective turns are placed closely together such that the total width of the wires placed on the coil form is 0.3 cm. or less. The antenna, therefore, lies in a plane which is to be spaced 5 cm. from the object of the test. It is convenient, then, to construct the core material with a circumferential, front edge which extends 5 cm. to the front of the place of the antenna such that as the antenna is placed against or laid upon an equipment under test, the proper spacing is maintained. The loop antenna is designed to provide a directional magnetic field at a given point on an axis perpendicular to the plane of the antenna and 5 cm. in front of the antenna. The antenna theory is described in detail in Chapter 32, Section 6 of *Elements of Physics*, Shortly and Williams, Second Edition, published by Prentice-Hall, Inc., Englewood Cliffs, N.J.

Referring to FIG. 2, the magnetic flux density for a given current in the antenna and at the selected point in front of the antenna is defined by the following equations;

$$\beta = \int d\beta \sin \alpha = \frac{\mu_0}{4\pi} \frac{1}{s^2} \sin \alpha \int dl \qquad (1)$$

By definition, $$\int dl = 2\pi r;$$

$\frac{\mu_0}{4\pi} = 10^{-7}$ (nonrationalized permeability of free space);

$\sin \alpha = \frac{r}{s}$; and $s = \sqrt{r^2 + d^2}$

Magnetic flux density is directly proportional to the number of turns N of the antenna; therefore, $$\beta = \frac{2\pi N I r^2 10^{-7}}{(r^2 + d^2)^{3/2}} \qquad (2)$$

Where
$\beta$ = Magnetic flux density in Teslas
$N$ = Number of turns in the antenna
$I$ = Current in amperes
$r$ = Radius of loop antenna in meters
$d$ = Distance from the plane of the loop in meters Using the dimensions set forth above for the loop antenna and the requirements defined by MIL-STD-461/462, the magnetic flux density at a point on the axis of the loop and 5 cm. from the plane defined by the antenna is $$\beta = \frac{(6.28)(10)(.06^2)(10^{-7})}{(.06^2 + .05^2)^{3/2}} = 4.75 \times 10^{-5} \text{ Teslas/Ampere} \qquad (3)$$

Therefore, a current of 2.1 amperes produces a magnetic flux density of $10^{-4}$ Teslas or 160 db. above 1 pico Tesla at a point on the axis of the loop, 5 cm. from the plane of the loop.

FIG. 3 is taken from MIL-STD-461/462 and sets forth the minimum acceptable susceptibility limit for certain types of equipment to be tested. The object of the test is to produce a directional magnetic field, substantially as described above, having a known intensity conforming substantially to a limit such as the one illustrated in FIG. 3, at discrete increments of frequency across a preselected band, usually 30 Hz. to 30 kHz., and to detect any degradation of performance of the equipment under test as a result of the field so produced. The method of detection varies from equipment to equipment. For instance, often it is sufficient to detect the affect of the magnetic field aurally; at other times elaborate measurements of the current, voltage or other characteristics must be made. Once degradation of performances is observed, it is desirable and often necessary to determine the exact intensity of the field which causes the trouble.

In accordance with previously known methods, the signal source 11 of FIG. 1 is tuned to a low frequency, and the amplitude of the signal source is adjusted to bring the current through resistor 12 and antenna 13 to a magnitude which, in accordance with equation (2) above, produces, for example, a magnetic field of intensity of $10^{-10}$ Tesla or 40 db. above 1 pico Tesla (db./pT). Note, however, that where a 1 ohm resistor is used, the current in the example given is 2.1 microamperes ($\mu a$.). Since the inherent noise associated with the signal source 11, the voltmeter (where a wideband meter is used), and the circuitry coupling the antenna, signal source and meter together virtually obscures a signal of this magnitude, the voltmeter 14 used to make the voltage, and thus the current, measurement, must of necessity be a narrowband device. It is well known that a narrowband voltmeter must be tuned in one manner or another to track the frequency of the signal source, and it is, of itself, a very delicate and expensive piece of equipment. Further, the tuning required must be accomplished manually or additional expense is required to link and calibrate the frequency control of the signal source 11 to that of the meter 14. In either case, error is often introduced, and the testing process is a laborious and time consuming process. An example of the narrowband type meter referred to is manufactured by the Fairchild Electronics Corporation of Amsterdam, New York; specifically, a Model EMC-10, Interference Analyzer, manufactured by the Electro-Metrics Division.

Still another problem exists in controlling the current to the loop antenna over the wide dynamic range of the typical test cycle. For instance, a power amplifier is required to provide the current required to produce the high-intensity magnetic fields, while at the low-intensity levels, attenuation often must be provided to reduce the amplitude of the signal to a lower level. There is a substantial need for a device which will accomplish this testing in a simplified, accurate manner.

Therefore, an object of this invention is to provide improved apparatus for testing apparatus for susceptibility to magnetic fields.

Another object is to provide improved apparatus for measuring the intensity of a magnetic field which is causing the malfunction of electrical apparatus.

A further object is to provide apparatus for improving the simplicity and accuracy of magnetic field susceptibility testing.

Yet another object is to provide apparatus for magnetic field susceptibility testing which provides high-quality results at low cost.

An additional object is to provide apparatus for magnetic field intensity testing which eliminates the requirement for a narrowband voltmeter.

Other objects and advantages will be apparent from the specification and claims and from the accompanying drawing illustrative of the invention.

Figure 4:
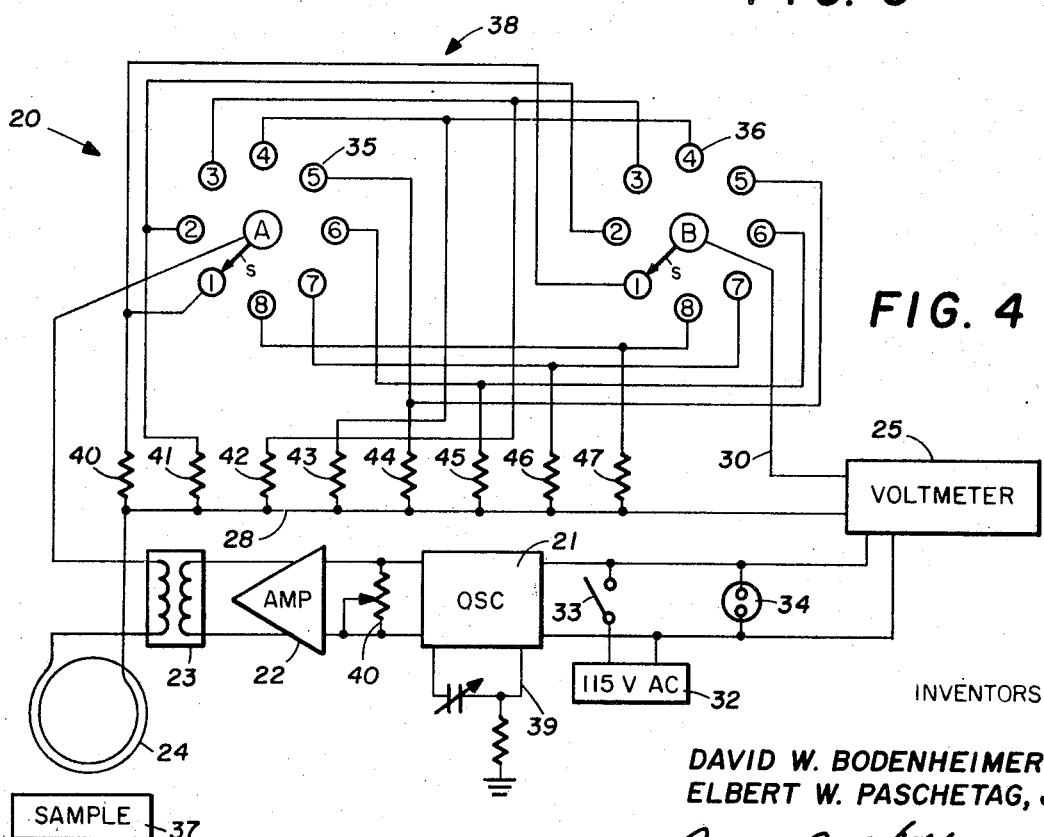
FIG. 4 is a schematic diagram of the magnetic field intensity testing apparatus of this invention.

Referring now to FIG. 4, the output of an electronic oscillator 21 is coupled to the input of a power amplifier 22. The oscillator 21 includes controls, such as 39, for varying the frequency of the output signal produced thereby over a wide range, typically 30 Hz. to 30 kHz., and controls, such as 40, for varying the amplitude of the signal so produced. In the embodiment described, the oscillator 21 is the equivalent of a Model 200CD audio oscillator manufactured by the Hewlett-Packard Company of Palo Alto, California.

The amplifier 22 is the equivalent of a Model MI-200 linear, power amplifier, manufactured by McIntosh Industries, Inc., of Binghamton, New York. The output of the amplifier 22 is coupled to the primary of transformer 23, which is a Chicago0Standard, Model F-751 or equivalent. One side of the secondary of transformer 23 is coupled to a first side of loop antenna 24 which is of the type called for in MIL–STD–4 61/462 and described in the foregoing material.

A plurality of resistors 40–47 are arranged together with one lead of each resistor coupled to a common junction point 28. The common junction 28 is also coupled to the remaining open terminal of loop antenna 24 and to a first terminal of voltmeter 25.

A rotary switch, indicated generally at 38, of a type well-known to those skilled in the art is included and has a first section 35 and a second section 36. In this embodiment, each switch section 35–36 has eight, fixed contacts 35–1 through 35–8 and 36–1 through 36–8, a wiper or slider 35–S and 36–S, and a fixed slider contact 35A, 36B associated, respectively, with the slider of each section. The sliders 35–S and 36–S of each section are mechanically linked such that when the slider of one section is in contact with a particular one of the eight fixed contacts of that section, the wiper of the remaining section is also in contact with a corresponding one of its eight fixed contacts. For the sake of convenience, as the wipers of the respective switch sections are in contact with corresponding fixed contacts, the switch will be taken, in order to facilitate the description, as in a certain position; either position 1, position 2, etc., up to position 8, and, fixed contact 1 of switch section 35 and fixed contact 1 of switch section 36 will be taken as position 1, fixed contacts 2 will be taken as position 2, and so on, as labeled and illustrated in the drawing (FIG. 4). The switch 38 is manually controlled by a knob in the usual manner, and an indicator on the knob indicates db./pT in accordance with the following table:

TABLE I

| Position 1 | 140 db/pT |
| Position 2 | 120 db/pT |
| Position 3 | 100 db/pT |
| Position 4 | 80 db/pT |
| Position 5 | 60 db/pT |
| Position 6 | 40 db/pT |
| Position 7 | 20 db/pT |
| Position 8 | 0 db/pT |

The side of the secondary of transformer 23 which is not coupled to the loop antenna 24 is coupled to the slider contact 35A, and the voltmeter 25 is coupled through a lead 30 to the slider contact 36B of the switch.

The voltmeter 25 is the equivalent of a digital voltmeter, Model 3440, including a Model 3445 Range Unit, manufactured by Hewlett-Packard, Inc., Palo Alto, California. The voltmeter is selected such that it responds to an input voltage range of from 0.010 to 0.100 volts or less. Thus, the dynamic range of the meter 25 is 0.010 to 0.100 volts.

An important part of the improved testing technique of this invention is the fact that this voltmeter is not a narrowband device of the type previously required. Further, in accordance with this invention, the indicated digital output of the voltmeter is converted in the manner set forth below to read directly in db. above 1 pico Tesla. In the particular embodiment described, for a particular voltage reading, the meter reads db./pT in accordance with the following table:

TABLE II

| Input Voltage | Meter Reading |
|---|---|
| 0.011 v. | 1 db/pT |
| 0.013 v. | 2 db/pT |
| 0.014 v. | 3 db/pT |
| v. | 4 db/pT |
| 0.018 v. | 5 db/pT |
| 0.020 v. | 6 db/pT |
| 0.022 v. | 7 db/pT |
| 0.025 v. | 8 db/pT |
| 0.028 v. | 9 db/pT |
| 0.032 v. | 10 db/pT |
| 0.035 v. | 11 db/pT |
| 0.040 v. | 12 db/pT |
| 0.045 v. | 13 db/pT |
| 0.050 v. | 14 db/pT |
| 0.056 v. | 15 db/pT |
| 0.063 v. | 16 db/pT |
| 0.071 v. | 17 db/pT |
| 0.080 v. | 18 db/pT |
| 0.089 v. | 19 db/pT |
| 0.100 v. | 20 db/pT |

The lead of each resistor 40–47 which is not coupled to the common junction 28, is coupled to the switch section, as follows: Resistor 40 is coupled to fixed contacts 1 of switch sections 35 and 36. Similarly, resistor 41 is coupled to switch contacts 2, resistor 42 to switch contacts 3, resistor 43 to switch contacts 4, resistor 44 to switch contacts 5, resistor 45 to switch contacts 6, resistor 46 to switch contacts 7, and resistor 47 to switch contacts 8.

In the embodiment disclosed, the resistors have the following values, stated in ohms:

TABLE III

40=0.0475±1%
41=0.475±1%
42=4.75±1%
43=47.5±1%
44=475±1%
45=4.75K±1%
46=47.5K±1%
47=475K±1%

Power is supplied to oscillator 21 and voltmeter 25 from a power source 32. For convenience, one ON-OFF switch 33 and a POWER ON indicating Lamp 34 is provided.

When a susceptibility test is to be conducted, the antenna 24 is positioned with respect to the apparatus to be tested or sample 37, as previously described.

Those skilled in the art will recognize that the specific equipment called out above as being useful in this embodiment of the present invention is relatively large in size and that each of these units can be replaced by miniaturized equipment without any substantial degradation of performance.

Figure 1:
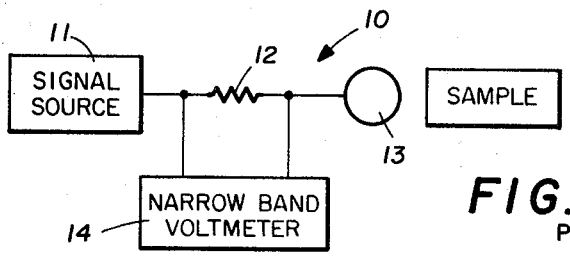
FIG. 1 is a schematic drawing illustrative of the magnetic field susceptibility testing technique previously known to the art.
Figure 2:
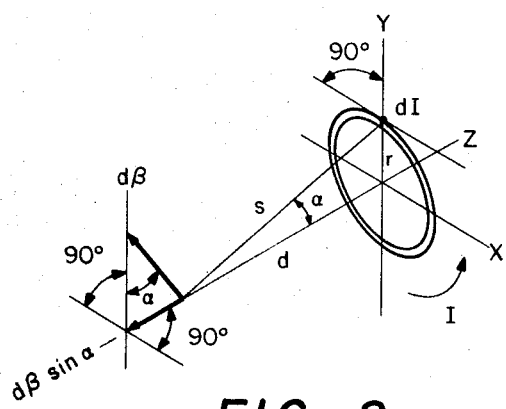
FIG. 2 is a sketch illustrating the method of calculation of the magnetic field intensity at a given point with respect to a large antenna of the type specified in MIL–STD–461/462.
Figure 3:
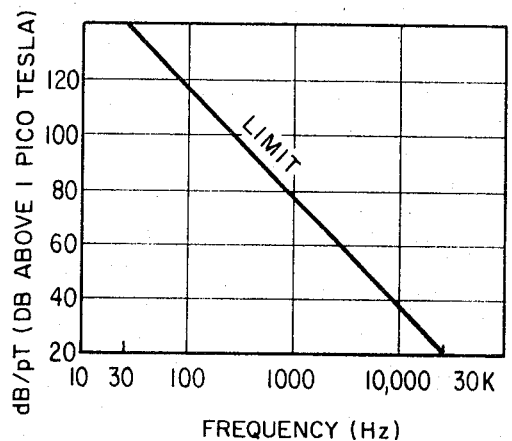
FIG. 3 is a graph illustrating the limits of acceptable magnetic field intensity for a particular test, as called for in MIL–STD–61/462.

Assuming that the testing apparatus 20 of this invention is to be used to test apparatus, such as 37, to determine its susceptibility to magnetic fields in accordance with test specification illustrated in FIG. 3, the oscillator 21 is first tuned to a frequency such as 30 Hz. At this frequency, following the specification of FIG. 3, the test sample 37, which may be, for example, a communications receiver, is to be subjected at one or more points to a magnetic field intensity of 160 db./pT, and the sample is then observed to determine whether or not its performance deteriorates as a result of the presence of the magnetic field.

The control knob of switch 38 is turned to place the switch in position 1, thus the knob indicator indicates 140 db. The amplitude of the output of the oscillator 21 is increased until the voltmeter indicates the equivalent of a voltage reading of 0.100 volts in accordance with Table II, or 20 db./pT. If it is desired to use an analog voltmeter, the 20 db./pT corresponds to a full-scale reading. The meter reading is added to the reading indicated by the position of the switch to obtain the total indicated magnetic field intensity, which in this case would be 160 db./pT.

We have seen from equations (2) and (3) that 2.1 amperes are required in the antenna 24 to produce a directional magnetic field whose intensity is 160 db./pT at the desired point with respect to the antenna, and it has been explained that the voltmeter 25 indicates 20 db./pT when a voltage of 0.100 volts appears at its input. When the meter 25 reads 20 db./pT, with the switch in position 1, the current in antenna 24 is 0.100 volts/0.0475 ohms or substantially 2.1 amperes, and the magnetic field intensity is 160 db./pT, as indicated.

With the switch adjusted to position 2, the current at a meter reading of 20 db./pT is 0.100/0.475 or 0.21 amperes. In accordance with equations (2) and (3), it is seen that this current produces a magnetic field intensity of $10^{-5}$ Teslas or 140 db./pT. Since the switch is in position 2, the knob indicator indicates a field intensity of 120 db./pT which is added to the reading of the voltmeter 25, or 20 db./pT, thus the indicated magnetic field intensity of 140 db./pT, which corresponds to the magnetic field intensity produced by a current of 0.21 amperes.

According to the specification requirement (FIG. 3), the sample 37 must be subjected to 20 db./pT at 30 kHz. The switch 38 is set at position 7, and the meter 25 is adjusted to indicate zero db./pT on its scale. In this condition, the current in the antenna is 0.010 volts/46.5 ohms or 0.21 milliamperes. From equation (3), it is apparent that 0.21 milliamperes is the current required to produce a magnetic field intensity of $10^{-8}$ Teslas or 20 db./pT. The same result is achieved by setting switch 38 to position 8 and adjusting the meter reading of 20 db./pT.

In a like manner, it is easily shown that for each switch position, the current in the antenna 24 and the indicated magnetic field intensity, i.e., the sum of the indicated meter reading and the indication of field intensity provided by the switch position indicator, correspond to the intensity of the magnetic field produced. By rotating the switch 38 to successive positions, the current, and thus the magnetic field intensity, is increased or lowered in predetermined, incremental steps; in this embodiment, 20 db./pT each. Intermediate field intensity changes, within the respective increments, are made by varying the oscillator level control 40, as explained in the following description.

In order to use the device 20 to test for magnetic field susceptibility in accordance with the specification illustrated in FIG. 3, the frequency control of oscillator 21 is adjusted to one end of the frequency spectrum, for instance, 30 Hz. The switch is set to position 1 (140 db./pT), and the voltmeter 25 is set to indicate 20 db./pT by adjusting the amplitude of the oscillator 21 output. The antenna 24 now has 2.1 amperes of current circulating therein, and is producing a directional magnetic field of 160 db./pT. The frequency of the oscillator 21 is then adjusted through some preselected band of frequencies by varying the frequency control 39 without altering the amplitude of the signal at the output of the oscillator. For instance, the frequency of the signal produced by the oscillator 21 is varied continuously through the band from 30 to 100 Hz., during which time the test sample is observed for degradation of performance. The current in the loop antenna 24 remains at 2.1 amperes and the magnetic field intensity at 160 db./pT, since the amplitude of the output of the oscillator 21 remains unchanged; thus, the magnetic field produced is always, during this time, in excess of the minimum acceptable level set forth by the specification. At a frequency of 100 Hz. the switch 38 is changed from position 1 to position 2. The intensity of the magnetic field is now reduced by 20 db., thus, the magnetic field intensity is 140 db./pT and still exceeds the limit of the specification (FIG. 3) at 100 Hz. Again the frequency of the oscillator 21 is varied, for instance, from 100 to 300 Hz. without changing the amplitude of the oscillator output, then the switch 38 is changed to position 3 where the resultant field is reduced by an additional 20 db. but still exceeds the requirement of the specification at 300 Hz. In this manner, a "stair-step" test is conducted, and the pattern of the test roughly corresponds to the limit set by the specification, but always exceeds the intensity of the magnetic field required. The entire test can be conducted by one operator in this manner in a matter of minutes. Additionally, the loop antenna 24 may be positioned at several points with respect to the test sample 37, and the test repeated several times without undue delay.

Once degradation of performance is observed in the test sample 37, the oscillator frequency is held at the offending frequency, and the level control 40 on the oscillator 21 is used to reduce the reading of the meter 25, until the sample again performs normally. If the sample does not return to normal performance within the first 20 db. reduction, i.e., the range of the meter, the switch 38 is changed to the next lower position, and the meter is again adjusted through its range to enable the detection of a change in the performance of the sample. The magnetic field is reduced in this manner through as many steps as are required until the sample again performs normally. The magnitude of the offending magnetic field is then easily determined by adding the indication of the switch position to the indication of the meter as read at the exact point where the sample is observed to again perform normally. The meter 25 indicates the intensity of the magnetic field in accordance with the voltage across the respective resistors 40–47 corresponding to the switch position selected, as shown in Table II.

It is now apparent from the foregoing that the susceptibility test can be performed rapidly and accurately with the device described, and the exact magnitude of the offending magnetic field, if any, can be quickly and accurately determined. Since the voltmeter described operates to detect only voltage in the range of 0.010 to 0.100 volts, there is no need for a narrowband voltmeter such as that required for use on the previously known testing methods. All the components described, except the antenna 24, are capable of being miniaturized and installed in a compact unit which can be conveniently transported for testing and by eliminating the requirement for the narrowband voltmeter, the total cost of this unit, as opposed to the total equipment previously required, is substantially reduced.

It is apparent that other variations and modifications may be made without departing from the present invention. Accordingly, it should be understood that the forms of the present invention described above and shown in the accompanying drawing are illustrative only and not intended to limit the scope of the invention.

What is claimed is:

1. A device for testing apparatus for sensitivity to magnetic fields and for measuring the magnitude of a magnetic field to which the apparatus is sensitive, comprising:

signal means for producing an alternating current signal, said signal means including frequency means for controlling the frequency and volume means for controlling the amplitude of said alternating current signal;

antenna means for producing, in response to the alternating current signal, a directional magnetic field;

first means coupled to the signal means for attenuating the alternating current signal in predetermined incremental steps corresponding to predetermined levels of the desired intensity of the directional magnetic field produced by said antenna means, and for producing, corresponding to the intensity of the magnetic field produced by said antenna means in response to control by said volume means, a voltage falling within a predetermined dynamic range;

first indicating means coupled to said first means for providing an indication of the magnetic field intensity corresponding to each incremental step; and second indicating means responsive to the voltage of said first means for indicating changes in the magnetic field intensity from said predetermined levels, whereby the intensity of the magnetic field in indicated by summing the indication of said first and second indicating means.

2. The device claimed in claim 1 wherein the first means includes a plurality of resistors each having a value corresponding respectively to the attenuation of one of said incremental steps.

3. The device claimed in claim 1 wherein the attenuation of each step is 20 db./pT with respect to the next adjacent step.

4. The device claimed in claim 1 wherein the predetermined dynamic range is 0.010 to 0.100 volts.

5. The device claimed in claim 1 wherein the second indicating means is a voltmeter having a dynamic range from 0.010 to 0.100 volts, and wherein the meter is calibrated in the following manner:

| Input Voltage | Meter Reading |
|---|---|
| 0.011 v. | 1 db/pT |
| 0.013 v. | 2 db/pT |
| 0.014 v. | 3 db/pT |
| 0.016 v. | 4 db/pT |
| 0.018 v. | 5 db/pT |
| 0.020 v. | 6 db/pT |
| 0.022 v. | 7 db/pT |
| 0.025 v. | 8 db/pT |
| 0.028 v. | 9 db/pT |
| 0.032 v. | 10 db/pT |
| 0.035 v. | 11 db/pT |
| 0.040 v. | 12 db/pT |
| 0.045 v. | 13 db/pT |
| 0.050 v. | 14 db/pT |
| 0.056 v. | 15 db/pT |
| 0.063 v. | 16 db/pT |
| 0.071 v. | 17 db/pT |
| 0.080 v. | 18 db/pT |
| 0.089 v. | 19 db/pT |
| 0.100 v. | 20 db/pT |

6. The device claimed in claim 1 wherein the predetermined steps correspond to magnetic field intensity as follows:

| | |
|---|---|
| Step 1 | 140 db/pT |
| Step 2 | 120 db/pT |
| Step 3 | 100 db/pT |
| Step 4 | 80 db/pT |
| Step 5 | 60 db/pT |
| Step 6 | 40 db/pT |
| Step 7 | 20 db/pT |
| Step 8 | 0 db/pT |

7. The method for determining over a first band of frequencies the susceptibility of apparatus to a magnetic field corresponding to a predetermined limit, comprising:

subjecting the apparatus to a directional magnetic field resulting from an alternating current signal;

varying the frequency of the alternating current signal through each of a plurality of predetermined, contigious bands of frequencies within said first band of frequencies;

varying the amplitude of the alternating current signal in predetermined, incremental steps at each specific frequency corresponding to the extremities of the predetermined bands of frequencies;

maintaining the intensity of the directional magnetic field, at each variation of the alternating current signal, above a predetermined magnitude corresponding the predetermined limit;

detecting any degradation in the performance of the apparatus while varying the frequency; and measuring the intensity of the magnetic field at each frequency where degradation is detected.

8. A device for generating a magnetic field for testing apparatus for sensitivity to a magnetic field comprising:

a generator for producing an alternating current output signal and including means for controlling the frequency and amplitude of said output signal;

first means coupled to said generator for varying the output signal in predetermined, incremental steps, said first means also providing a voltage falling within a predetermined dynamic range and corresponding to variations in output signal amplitude at said generator, within each of said incremental steps;

antenna means for transmitting a magnetic field of a given intensity to the apparatus to be tested in response to said output signal as varied by said first means, said magnetic field having an intensity corresponding to the incremental steps of said first means; and indicating means responsive to the voltage of said first means for indicating changes in magnetic field intensity from the field intensity of each incremental step and corresponding to changes in signal amplitude at said generator.

* * * * *